Figure 1:
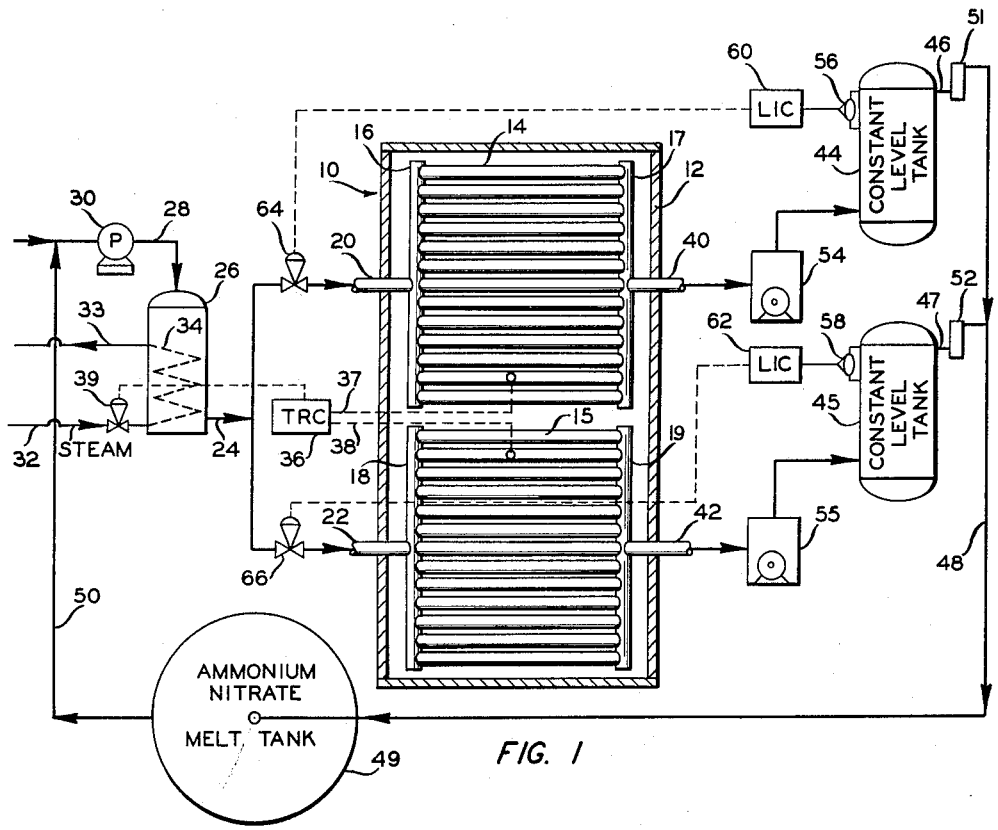

INVENTORS
F. A. BOWERS
J. D. STAFFORD JR.
BY Hudson and Young
ATTORNEYS

Jan. 19, 1960    F. A. BOWERS ET AL    2,921,335
APPARATUS FOR GRANULATING MOLTEN SOLIDS
Filed Aug. 27, 1956    2 Sheets-Sheet 2

INVENTORS
F.A. BOWERS
J. D. STAFFORD JR.
BY
Hudson & Young
ATTORNEYS

United States Patent Office 2,921,335
Patented Jan. 19, 1960

2,921,335

APPARATUS FOR GRANULATING MOLTEN SOLIDS

Frederick A. Bowers, Cactus, and Joseph D. Stafford, Jr., Dumas, Tex., assignors to Phillips Petroleum Company, a corporation of Delaware Application August 27, 1956, Serial No. 606,247

4 Claims. (Cl. 18—2.7)

This invention relates to a process and apparatus for granulating or prilling molten materials, such as molten salts and, particularly, ammonium nitrate. A specific aspect of the invention pertains to a method of removing prilled material from the bottom of a prilling tower.

The granulation or prilling of normally solid materials by spraying the same in molten form into a cooling tower is conventional in the art. Patent 2,402,192, issued June 18, 1946, to Williams et al. illustrates one type of process for prilling ammonium nitrate in which the molten salt is sprayed upwardly and inwardly in the top of a cooling tower so that the sprayed droplets gravitate through the tower in countercurrent flow to cooling air. The solid prills are recovered from the bottom of the tower by means of a conveyor which delivers the prills to conveyor means for transfer to a conventional drier for removal of moisture from the prills.

Patent 2,528,407, issued October 31, 1950, to Yeandle discloses a process and apparatus for prilling ammonium nitrate wherein the molten salt is sprayed thru a plurality of spray headers downwardly into a cooling tower where the sprayed droplets are solidified in contact with countercurrently flowing air. Yeandle provides a quiescent zone subjacent the spray headers which is positively heated by indirect heat exchange to assure the formation of spheres before the droplets become solidified.

In the prior art process disclosed, the problem of breakage of the prills as they hit the bottom of the tower is a real one. The conical bottom of the tower and other conventional tower structure provide a rigid metallic surface upon which the prills impinge and suffer severe mechanical shock, resulting in fracture and breakage. It is also found that the molten droplets in the Yeandle process form substantially regular spheres in the quiescent zone but due to the heat therein their viscosity as they enter the turbulent air column is even lower than the viscosity of the molten solid in the spray conduit. This results in the distortion of the spherical droplets in the turbulent ascending air stream so that as the droplets solidify they are not in perfectly spherical form.

It is accordingly an object of the invention to provide an improved process and apparatus for prilling molten material and particularly molten salts such as ammonium nitrate. Another object is to provide an improved ammonium nitrate prilling tower. A further object is to provide an improved method of prilling ammonium nitrate. It is also an object of the invention to provide an improved method and apparatus for recovery of prills from the bottom of a prilling tower without fracture and breakage of the prills. Other objects will become apparent from a consideration of the accompanying disclosure.

One aspect of the invention comprises spraying molten droplets of normally solid material into a substantially quiescent zone which is not heated by positive means, the only heat supplied to this zone being from sensible heat of the droplets passing therethru. In this manner the droplets are substantially cooled so that their viscosity increases to the point where they suffer less distortion upon entering the ascending air currents in the subjacent cooling section of the tower and thereby form more nearly perfect spheres than are formed in a process in which the quiescent zone is positively heated. In order to minimize heating effect of the hot molten salt in the prilling conduits a heavy coat of insulation is provided around these conduits. This insulation of the prilling conduits also makes it feasible to spray the molten salt at a lower temperature than would otherwise be possible because of the danger of solidification of the salt in and around the orifices thru which the same is sprayed.

Another aspect of the invention comprises recovering cooled prills from the bottom of the prilling tower in a manner which avoids fracturing and breakage of the prills. Air slides are positioned in the lower section of the tower projecting inwardly and downwardly from the walls thereof so as to form a hopper adjacent the axis of the tower which delivers the prills to a suitable conveyor means, such as an endless concave belt, leading to a delivery point outside of the tower. The air slides comprise perforate, substantially plain-surfaced material thru which air my be injected obliquely and upwardly so as to break the fall of the prills and provide an air cushion which eases and delivers the prills on to the conveyor means without undue mechanical shock to the prills. Wire screen of 8 to 50 mesh has been found suitable for use as the air slides in the tower.

Figures 3, 4:
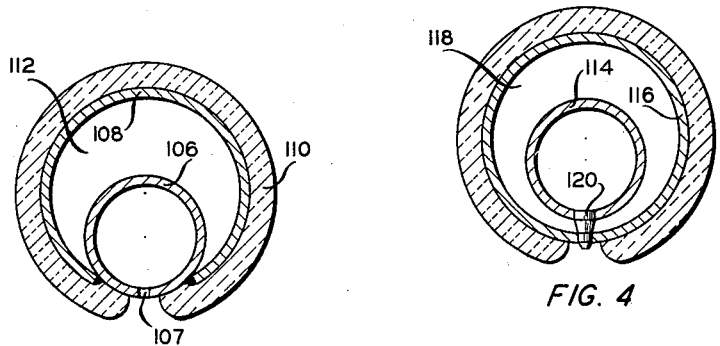
Figure 2:
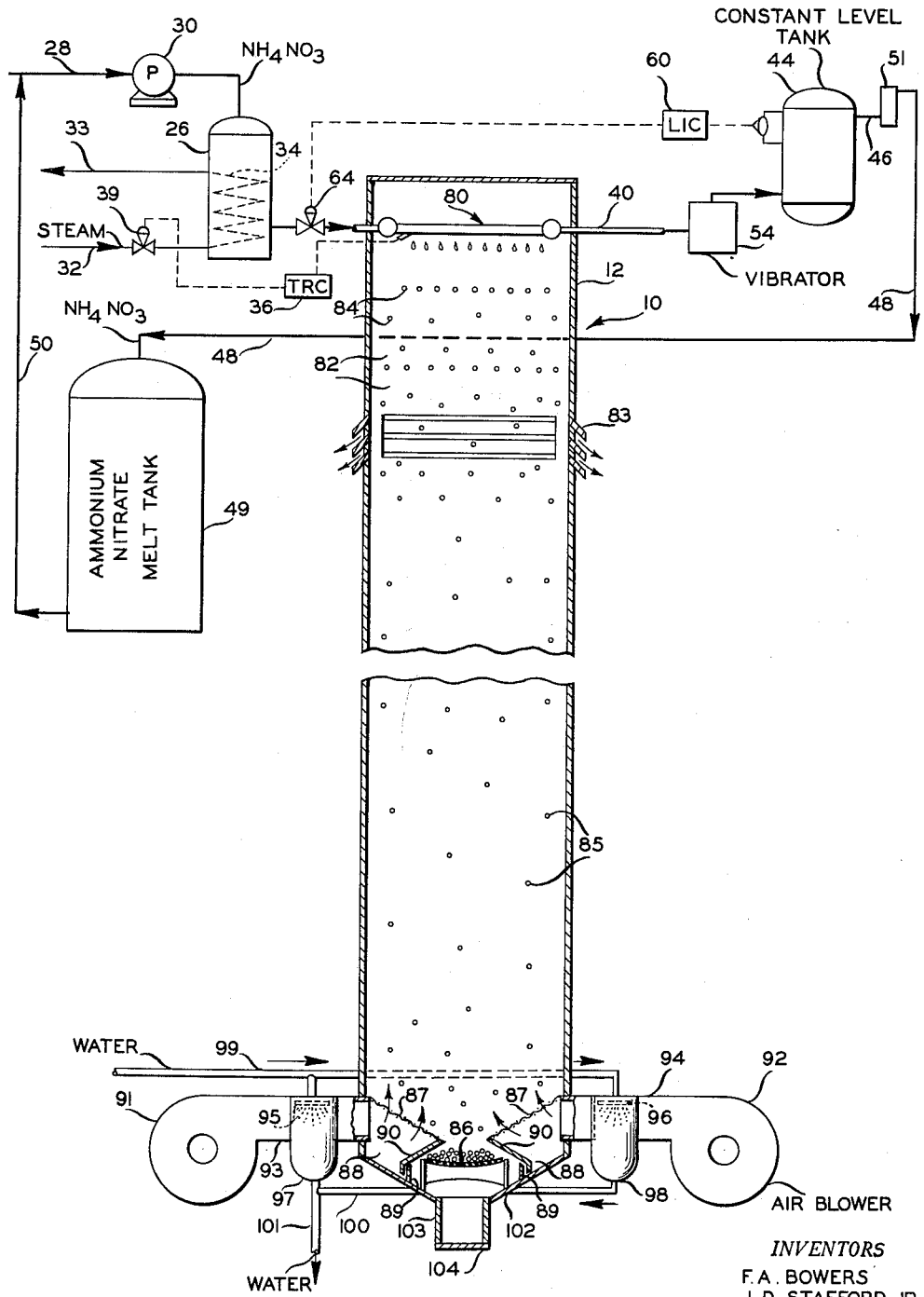

A more complete understanding of the invention may be had by reference to the accompanying schematic drawing of which Figure 1 is a plan view of the upper section of the tower at the level of the prilling or spray conduits; Figure 2 is an elevation in partial cross section of one embodiment of the prilling tower; Figure 3 is a cross section of one of the spray or prilling conduits thru an orifice thereof; and Figure 4 is a partial cross section of another embodiment of the prilling or spray conduits at one of the orifices therein.

Referring to Figure 1 a prilling tower 10 comprises rectangular walls 12 within which are positioned two batteries of prilling conduits 14 and 15 extending between headers 16 and 17, and 18 and 19, respectively. Headers 16 and 18 connect with feed inlet conduits 20 and 22, respectively, which in turn connect with the outlet line 24 from heat exchanger 26. Feed line 28 in which is positioned pump 30 connects with a suitable source of molten ammonium nitrate or other material to be sprayed and steam lines 32 and 33 connected with heat exchange coil 34 in heat exchanger 26 for the introduction of steam to and withdrawal of steam from heat exchanger 26. A temperature-recorder-controller 36 is connected to a prilling conduit in each battery by means of lines 37 and 38 so as to be sensitive to the temperature of the melt in these conduits. This instrument is in control of motor valve 39 and regulates the amount of heat exchange or steam input to exchanger 26 so as to maintain the desired temperature in the prilling conduits. Outlet lines 40 and 42 from the two batteries of prilling conduits connect with constant level tanks 44 and 45, respectively. These tanks are provided with outlet lines 46 and 47, respectively, which connect with line 48 leading to tank 49. Tank 49 is connected by means of line 50 with line 28 upstream of pump 30 for recycle of the molten liquid or solution thru the heat exchanger and the prilling system. Rotameters 51 and 52 are positioned in lines 46 and 47, respectively, to measure the rate of flow of liquid thru these lines. Pulsators or vibrators 54 and 55 are connected in lines 40 and 42, respectively, for the purpose of pulsating or vibrating the liquid being sprayed thru the hereinafter described spray orifices. Vibrators of the type contemplated and within the purview of the invention are disclosed in the application of J. D. Stafford et al., Serial No. 540,496, filed October 15, 1955. The vibrator described in said application pulsates or vibrates the liquid in the conduits or spray orifices by means of a pressure diaphragm acting directly on the liquid. This pressure diaphragm may be actuated by any suitable means, mechanically or electrically. Vibration of the liquid in the orifice has been found to produce more uniform prills and, where the vibration rate is high, prilling is effected at a much more rapid rate than is possible without the effect of vibration. Vibration rates in the range of about 300 to 1100 vibrations per second are suitable, the optimum rate depending upon the particular material and spraying conditions being used.

Hydraulic pressure in the prilling conduits is maintained at a relatively constant level by controlling the level of melt or solution in tanks 44 and 45 by means of liquid-level-controllers 56 and 58 which actuate level-indicating-controllers 60 and 62, respectively, which in turn are operatively connected to motor valves 64 and 66, respectively. Varying the flow of liquid thru valves 64 and 66 of course varies the level of liquid in tanks 44 and 45 and increases or decreases the flow thru rotameters 51 and 52. Level indicating controls 60 and 62 are set to provide the desired flow thru rotameters 51 and 52, which in one particular application is 12 gallons per minute.

Referring to Figure 2, the prilling conduit assembly 80 is positioned in the upper section of prilling tower 10. Quiescent, sphere-forming zone 82 is provided subjacent the prilling conduit assembly and extending down to vent louvers 83 at the upper end of the turbulent cooling section of the tower. In prilling ammonium nitrate and similar melt or solution the liquid material is sprayed into quiescent zone 82 at a temperature above the solidification temperature of the material and, as the sprayed droplets 84 fall thru the quiescent zone, they reach stable physical equilibrium (spherical) before they enter the turbulent cooling section of the tower below vents 83 where the droplets are completely solidified and are cooled substantially below the solidification temperature. The solid prills or spheres 85 are cooled on a suitable conveyor means such as a concave belt 86. Recovery means for the prills also include screens 87 which slope inwardly and downwardly from the tower walls in the form of a hopper centered on belt 86 which projects laterally beyond the opening or hopper formed by the screens and extends to a delivery point outside of the tower. In prilling ammonium nitrate a 20 mesh screen has been found preferable but a mesh range of 8 to 50 may be utilized with different materials and under different prilling conditions. The openings in the screen or other perforate material such as perforate sheet metal should be smaller than the prills in order to avoid drop-thru and undue collection of prills below the screens. However, where undersize prills or particles pass thru the screens they collect in the area designated 88 and may be removed by removing detachable risers 89. Risers 89 form a seal with screen support 90 to prevent undue bypassing of air around the screens. Blowers 91 and 92 force a sufficient volume of air thru conduits 93 and 94, respectively, and thru screens 87 to provide the desirable air cushion for the descending prills and also to provide sufficient cooling of the prills in the tower. Positioned in conduits 93 and 94 are sprays 95 and 96, respectively, in mist extractors 97 and 98, respectively. Water is supplied thru line 99 to sprays 95 and 96. Excess water is recovered thru lines 100 and 101 and may be recycled to the sprays or disposed of in other manner. Tower bottom 102 converges to an outlet 103 from which prills which have fallen off belt 86 may be recovered periodically by removing closure 104 or by a valve positioned therein (not shown).

Air slides 87 may extend inwardly from all four sides of the tower, in the case of a rectangular or square tower, or they may be positioned along only one pair of opposite sides to form an opening therebetween extending the width of the tower. In a cylindrical tower these slides may comprise a single annular arrangement with a circular opening at the axis of the tower. The preferred slope of the screens or air slides is about one inch of drop to the foot; however, a slope in the range of ½ to 4 inches per foot is operable to provide the desired air slide and protect the prills from undue mechanical shock and breakage. As shown in Figure 2, air slides 87 occupy a major portion of the cross-sectional area of the tower. The air slides overlap conveyor belt 86 so as to deliver all of the prills to the conveyor belt.

Figure 3 shows a cross section of a preferred prilling conduit structure and arrangement in which an inner melt-conducting conduit 106 is provided with a series of orifices 107 spaced apart on a line parallel with the axis of the conduit. A second conduit 108 surrounds the major portion of the inner conduit 106 with its axis directly above the axis of conduit 106 so that prilling orifices 107 are not inclosed. Conduit 108 is welded to conduit 106, as shown, and a heavy layer of heat insulating material 110 encases the conduit assembly leaving an opening for each of orifices 107. The space 112 between conduits 106 and 108 is utilized for circulating steam or other heating medium around conduit 106. Figure 4 shows another arrangement of a prilling conduit 114 and a surrounding conduit 116 to provide a space 118 for circulating heat-exchange fluid. In this embodiment of the invention, a spray nozzle 120 extends from each orifice in conduit 114 thru outer conduit 116.

In a specific embodiment of the invention a hot ammonium nitrate melt or solution containing water in the range of about 4 to 6 weight percent was sprayed thru the spray orifices in an arrangement similar to that of Figure 1 at a temperature of about 143° C. The sprayed droplets descended the tower first thru a quiescent zone of about 20 feet in height and then thru about 100 feet of the cooling section of the tower in which air ascends countercurrently to the gravitating prills. The orifices in the spray conduits were about .042 inch in diameter and the resulting prills were about 1/16 inch in diameter. Air was injected by means of the blowers thru the water sprays and mist extractors at sufficient velocity to provide the desired cooling in the tower and to effect the removal of prills from the bottom of the tower without noticeable damage or breakage of the prills. The temperature of the injected air was at least 10 to 15° below atmospheric temperature and was more effective than air at atmospheric temperature in cooling the prills which were recovered at a temperature of 75 to 80° C.

Operating in the above manner, 375 tons of prills were made per 24 hour day and the prills were of excellent form (substantially spherical) and of uniform size. In fact 94% of the prills passed thru a 10-mesh screen and were retained on a 14-mesh screen. Prill breakage was substantially completely avoided.

Various arrangements of spray conduits and spray orifices are within the purview of the invention. In one effective arrangement which has been used spray heads 2½" in diameter containing 25 uniformly-spaced 0.042" orifices were screwed into the lower side of conduits 106 (Figure 3) at 2 foot intervals along the length of the conduit. This arrangement, of course, increases the capacity of the spray assembly but is not essential to the invention.

Certain modifications of the invention will become apparent to those skilled in the art and the illustrative details disclosed are not to be construed as imposing unnecessary limitations on the invention.

We claim:

1. Apparatus for producing generally spherical granules from molten solids which comprises an upright tower; injection means for introducing droplets of molten material into an upper section of said tower; air vents in an upper section of the walls of said tower below said injection means; air slides in a lower section of said tower comprising means for injecting air inwardly and upwardly toward the axis of said tower thru multi-perforate surfaces sloping inwardly and downwardly from the tower walls in the range of ½ to 4″ per foot so as to provide a hopper at the axis of said tower for granular solids to pass thru, said air slides occupying a major portion of the cross-sectional area of said tower; conveyor means below said hopper for catching and removing said solids from said tower; conduit means for passing air to the air slides; and blower means exhausting into said conduit means from the atmosphere.

2. The apparatus of claim 1 wherein said air slides comprise screens of 8 to 50 mesh.

3. Apparatus for producing generally spherical granules from molten solids which comprises an upright tower; injection means for introducing droplets of molten material into an upper section of said tower; air vents in an upper section of the walls of said tower below said injection means; air slides in a lower section of said tower comprising means for injecting air inwardly and upwardly toward the axis of said tower thru multi-perforate surfaces sloping inwardly and downwardly from the tower walls in the range of about ½ to about 4″ per foot so as to provide a hopper at the axis of said tower for granular solids to pass thru, said air slides occupying a major portion of the cross-sectional area of said tower; means below said hopper for catching said solids; and means for injecting air thru said air slides into said tower.

4. The apparatus of claim 1 wherein said tower is of rectangular cross section, at least in the section in which said air slides are positioned, and said air slides comprise a screen along each wall of the tower.

References Cited in the file of this patent

UNITED STATES PATENTS

| | | |
|---|---|---|
| 6,460 | Smith | May 22, 1849 |
| 1,837,869 | Jewett et al. | Dec. 22, 1931 |
| 2,510,574 | Greenhalgh | June 6, 1950 |
| 2,528,407 | Yeandle | Oct. 31, 1950 |
| 2,633,604 | Allen et al. | Apr. 7, 1953 |
| 2,714,224 | Schaub | Aug. 2, 1955 |
| 2,770,008 | Yeandle et al. | Nov. 13, 1956 |

FOREIGN PATENTS

| | | |
|---|---|---|
| 932,246 | Germany | Aug. 29, 1955 |